(12) United States Patent
He

(10) Patent No.: US 12,442,517 B1
(45) Date of Patent: Oct. 14, 2025

(54) LED LIGHTING FIXTURE AND ASSEMBLING METHOD THEREOF

(71) Applicant: Shiting He, Zhumadian (CN)

(72) Inventor: Shiting He, Zhumadian (CN)

( * ) Notice: Subject to any disclaimer, the term of this patent is extended or adjusted under 35 U.S.C. 154(b) by 0 days.

(21) Appl. No.: 19/220,404

(22) Filed: May 28, 2025

(51) Int. Cl.
| | |
|---|---|
| *F21V 21/002* | (2006.01) |
| *F21S 4/10* | (2016.01) |
| *F21V 17/12* | (2006.01) |
| *F21V 19/00* | (2006.01) |
| *F21Y 115/10* | (2016.01) |

(52) U.S. Cl.
CPC .............. *F21V 21/002* (2013.01); *F21S 4/10* (2016.01); *F21V 17/12* (2013.01); *F21V 19/003* (2013.01); *F21Y 2115/10* (2016.08)

(58) Field of Classification Search
CPC ...... F21V 21/002; F21V 17/12; F21V 19/003; F21S 4/10
See application file for complete search history.

(56) References Cited

U.S. PATENT DOCUMENTS

| | | | | |
|---|---|---|---|---|
| 10,900,656 | B1* | 1/2021 | Wang | F21V 3/00 |
| 2009/0002991 | A1* | 1/2009 | Huang | H01R 4/2406 |
| | | | | 362/249.16 |
| 2009/0291587 | A1* | 11/2009 | Sato | H01R 12/675 |
| | | | | 439/426 |
| 2024/0360964 | A1* | 10/2024 | He | F21V 19/0025 |
| 2024/0384842 | A1* | 11/2024 | Zou | F21V 3/02 |

* cited by examiner

*Primary Examiner* — Tracie Y Green
*Assistant Examiner* — Michael Chiang
(74) *Attorney, Agent, or Firm* — Birchwood IP

(57) ABSTRACT

A lighting fixture and an assembly process of the lighting fixture are provided. The lighting fixture includes a lamp cover, a lampshade, an installation component, a light source component, and a conductive component. The lampshade is provided below the lamp cover, the installation component is provided inside the lamp cover, and an installation slot configured for a wire to pass through is provided in the installation component. The light source component is provided in the lampshade. The conductive component is provided on the installation slot, and the conductive component penetrates the wire located in the installation slot and contacts the light source component to turn on the light source component when powered on.

10 Claims, 7 Drawing Sheets

LED LIGHTING FIXTURE AND ASSEMBLING METHOD THEREOF

TECHNICAL FIELD

The present disclosure relates to the field of lamp manufacturing technologies, and in particular, to an LED lighting fixture and an assembling method thereof.

BACKGROUND

Light string is widely used in the field of decorative lighting. It is usually hung on walls or shaped objects to create an environmental atmosphere. The light emitted by the light string can serve as a good decorative backdrop.

In the traditional lighting assembly process, for the wire connection of multiple lamps in series, it is necessary to cut the wires into multiple sections one by one, the outer skin is stripped off, and segmented connection of the wires is performed. The operation is cumbersome, time-consuming and labor-intensive, and the production efficiency is low.

Therefore, it is necessary to propose a technical solution to address the aforementioned shortcomings.

SUMMARY

The present disclosure adopts the following technical solution.

An LED lighting fixture, including a lamp cover, a lampshade, an installation component, a light source component, and a conductive component; where the lampshade is provided below the lamp cover; the installation component is provided inside the lamp cover, and an installation slot configured for a wire to pass through is provided in the installation component; the light source component is provided inside the lampshade; the conductive component is provided above the installation slot, and the conductive component penetrates the wire located in the installation slot and contacts the light source component to turn on the light source component when powered on.

In some embodiment of the present disclosure, two sides of the lamp cover are provided with a wire inlet end and a wire outlet end for the wire to pass through; the installation component includes an installation seat; the installation slot is provided in the installation seat, and two ends of the installation slot are aligned with the wire inlet end and the wire outlet end, respectively.

In some embodiments of the present disclosure, the conductive component includes a threading nail; the threading nail is provided on the installation slot; a lower of the threading nail penetrates the wire, extends out of a bottom of the installation seat, and abuts against the light source component for the light source component to be powered on and light up.

In some embodiments of the present disclosure, the conductive component further includes an installation plate; the installation plate is provided above the installation seat, and the installation plate is provided with a first nail groove for the threading nail to pass through.

In some embodiments of the present disclosure, the light source component includes a wick; the wick is provided below the installation seat; a bottom of the threading nail penetrates through the installation seat and is electrically contacted with the wick, so that the wick is powered on and light up.

In some embodiments of the present disclosure, the installation component further includes a guide seat provided at the bottom of the installation seat; the guide seat is provided with a first accommodation groove configured to accommodate an end of the wick and a second accommodation groove configured to accommodate the threading nail; the first accommodation groove and the second accommodation groove are adjacent and communicated to each other; when the threading nail passes through the installation seat, the threading nail is located in the second accommodation groove and contacts the wick located in the second accommodation groove.

In some embodiments of the present disclosure, the light source component further includes a lamp sleeve; the wick is provided inside the lamp sleeve, an upper of the wick is provided with a connection groove configured to connect the guide seat; in a working state, the guide seat is provided in the connection groove.

In some embodiments of the present disclosure, a lower of the lamp cover is connected to an upper of the lampshade by threads.

In some embodiments of the present disclosure, a hanging bracket is provided above the lamp cover for hanging.

The present disclosure also relates to an assembling method for the lighting fixture, applied to the above-mentioned LED lighting fixture, including the following steps: flattening the wire to ensure no twisting or knotting; placing the wire into the installation seat with the installation slot, ensuring the wire to be in a correct position; installing the installation plate to ensure a tight fit between the installation plate and the installation seat; using an automatic or semi-automatic nail driver, driving the threading nail into the installation seat according to a preset first nail slot and entering the second accommodation groove; wrapping each connection with adhesive to ensure that an insulation layer is intact and not exposed; inserting the wick into the first accommodation groove to make electrical contact with the threading nail and complete an assembly of the lighting fixture; performing a lighting test to confirm that the lighting fixture is working normally.

The present disclosure relates to an LED lighting fixture and an assembling method thereof. The wire is limited by the installation slot, and threading nail is used to penetrate the wire and the installation seat, and then come into contact with the wick to achieve electrical conductivity and light up the wick, thereby avoiding the segmentation, peeling, and complex wiring steps of the wires in the process. The process is simple and easy to understand, rendering it convenient for a worker to quickly grasp and operate, greatly improving production efficiency and reducing production costs. At the same time, the electrical contact is stable, and the failure rate is reduced through nail connection.

DESCRIPTION OF EMBODIMENTS

The following will provide a clear and complete description of the technical solution of the present disclosure in combination with the accompanying drawings. Obviously, described embodiments are only a part of the embodiments of the present disclosure, not all of them. Based on the embodiments of the present disclosure, all other embodiments obtained by those skilled in the art without creative work are within the protection scope of the present disclosure.

In the description of the present disclosure, it should be noted that terms "center", "up", "down", "left", "right", "vertical", "horizontal", "inside", "outside" and other directional or positional relationships indicated are based on the directional or positional relationships shown in the accompanying drawings, only for a convenience of describing the present disclosure and simplifying the description, and do not indicate or imply that the device or element referred to must have a specific orientation, be constructed and operated in a specific orientation, and therefore cannot be understood as a limitation of the present disclosure. Besides that, terms "first", "second", and "third" are only used for a descriptive purpose and cannot be understood as indicating or implying relative importance.

In the description of the present disclosure, it should be noted that unless otherwise specified and limited, terms "installation", "connection to", and "connection with" should be broadly understood, for example, it can be a fixed connection, a detachable connection, or an integral connection; it can be a mechanical connection or an electrical connection; it can be directly connected, indirectly connected through an intermediate medium, or connected internally between two components. For those skilled in the art, specific meanings of the above terms in the present disclosure can be understood in a specific situation.

Figure 1:
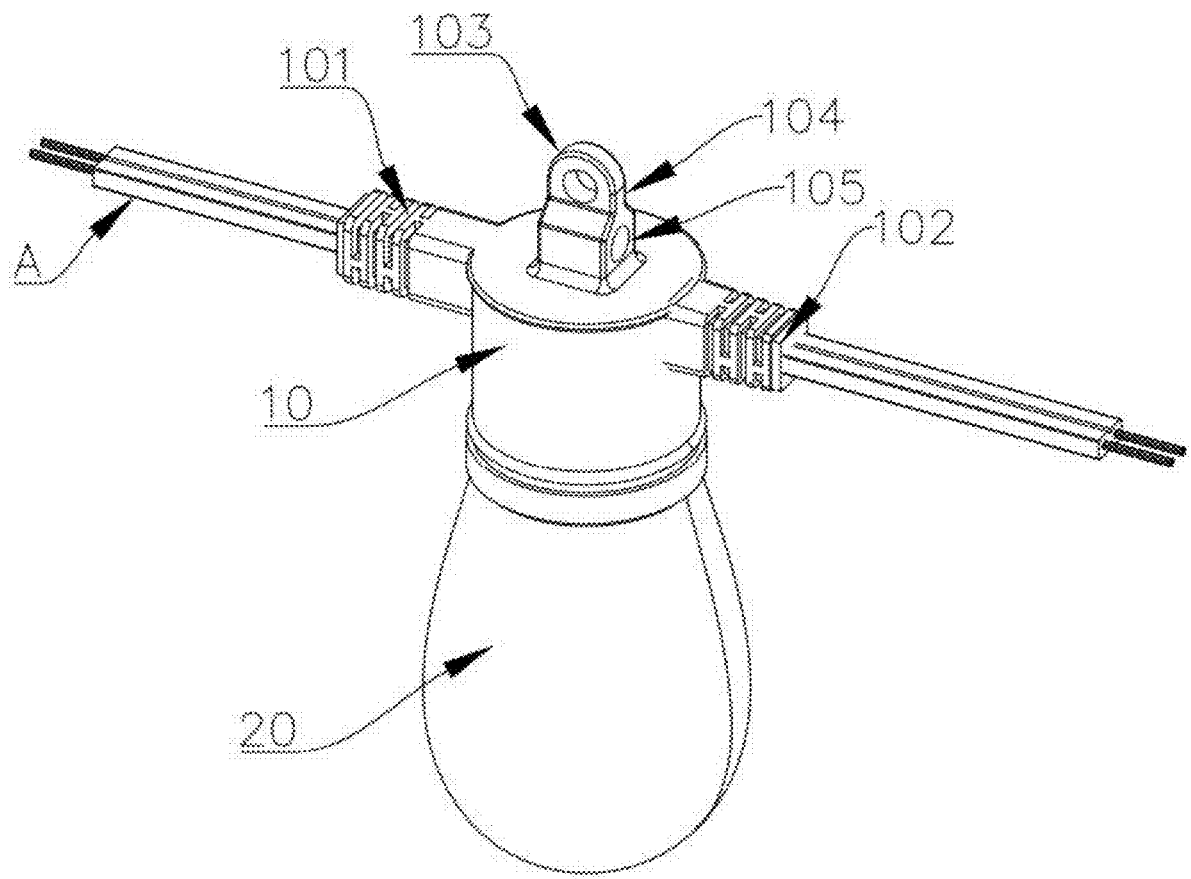
FIG. 1 is an overall schematic diagram of an LED lighting fixture according to the present disclosure.
Figure 2:
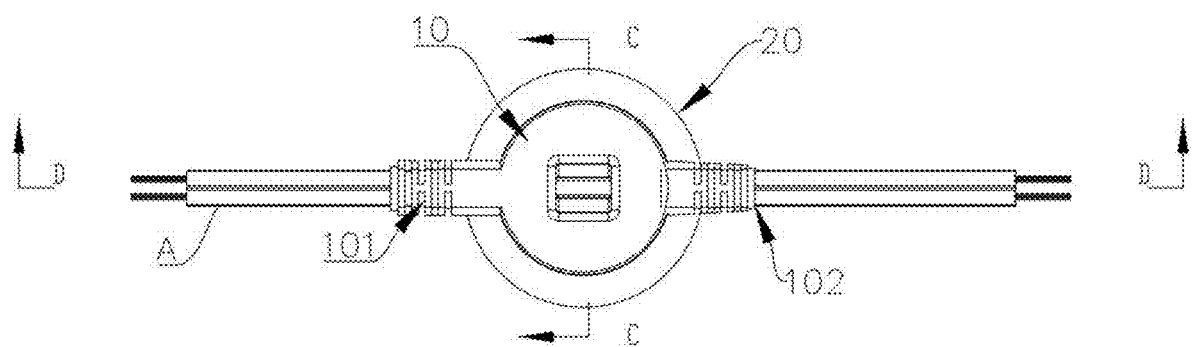
FIG. 2 is a top view of FIG. 1.
Figure 3:
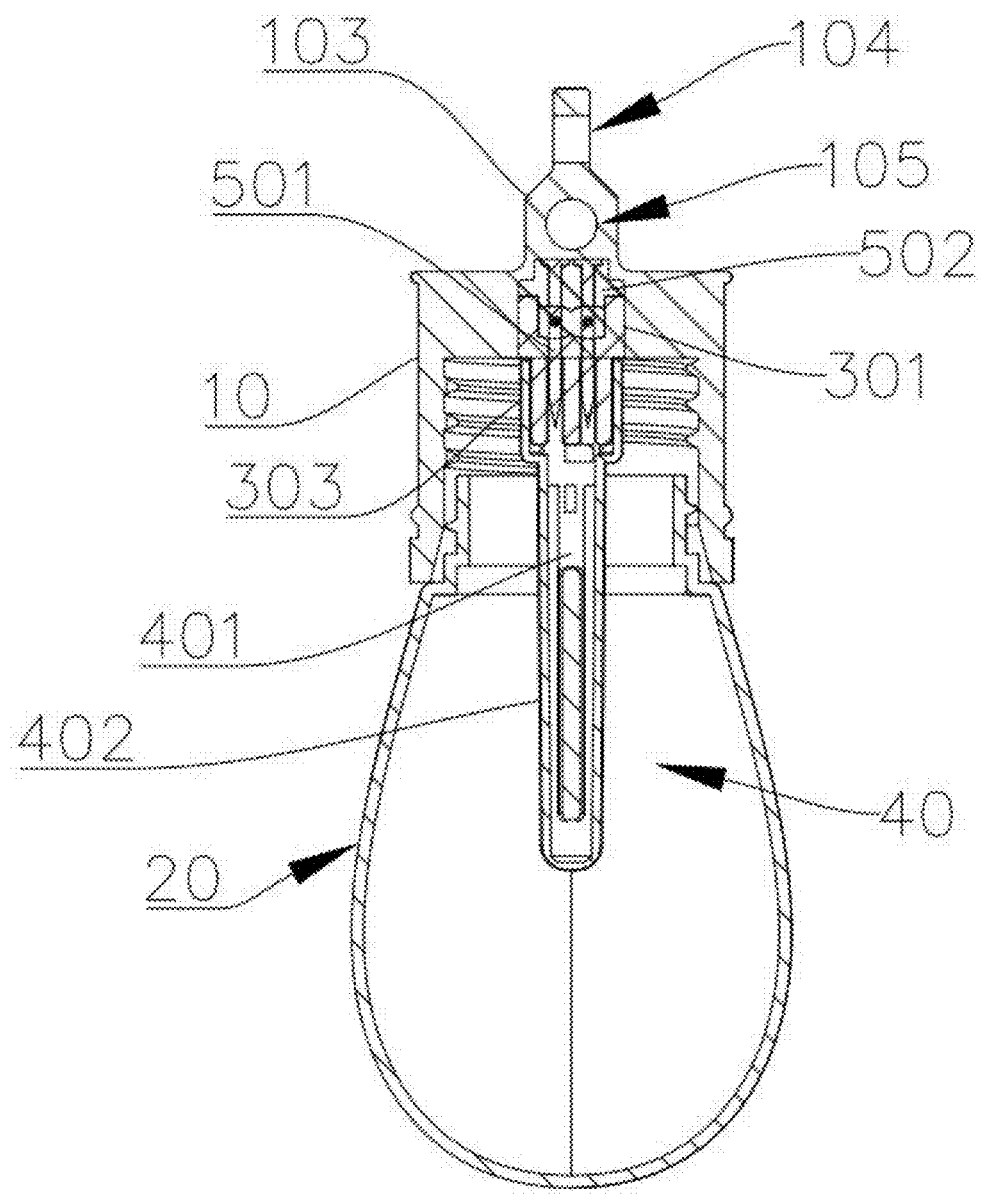
FIG. 3 is a cross-sectional view of C-C in FIG. 2.
Figure 4:
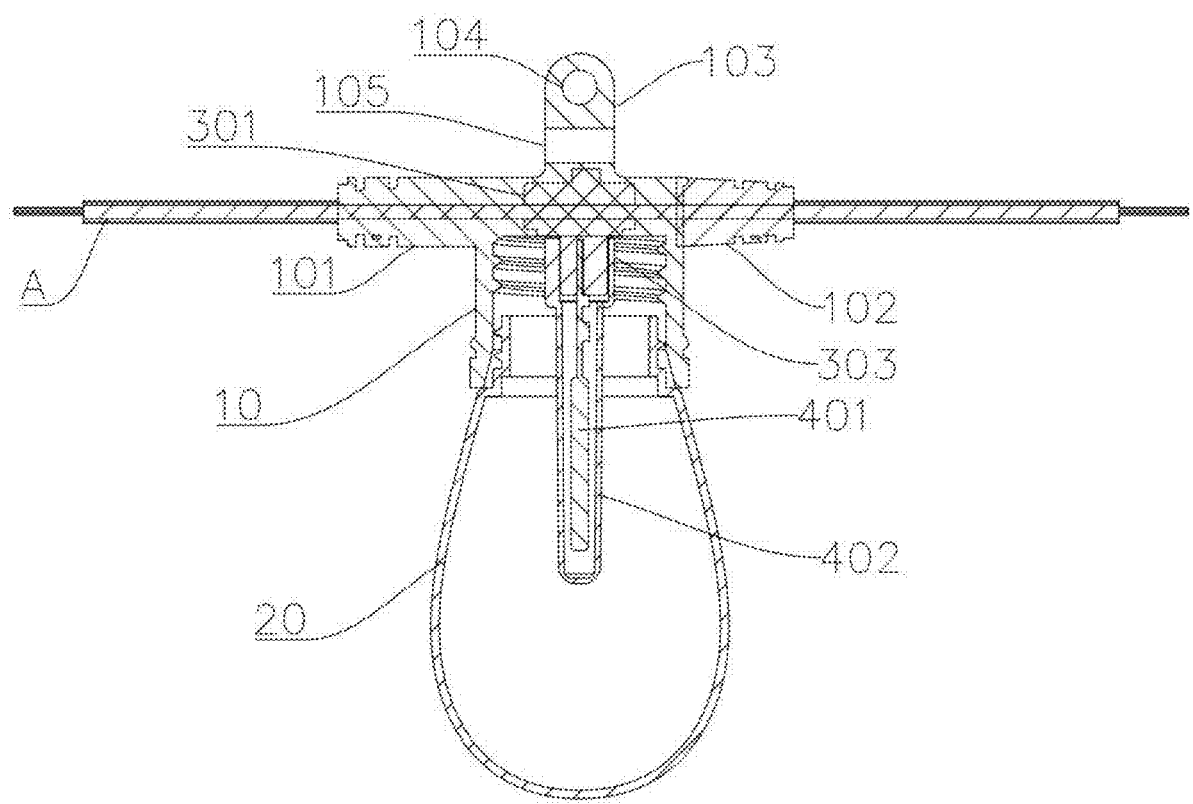
FIG. 4 is a cross-sectional view of D-D in FIG. 2.
Figure 5:
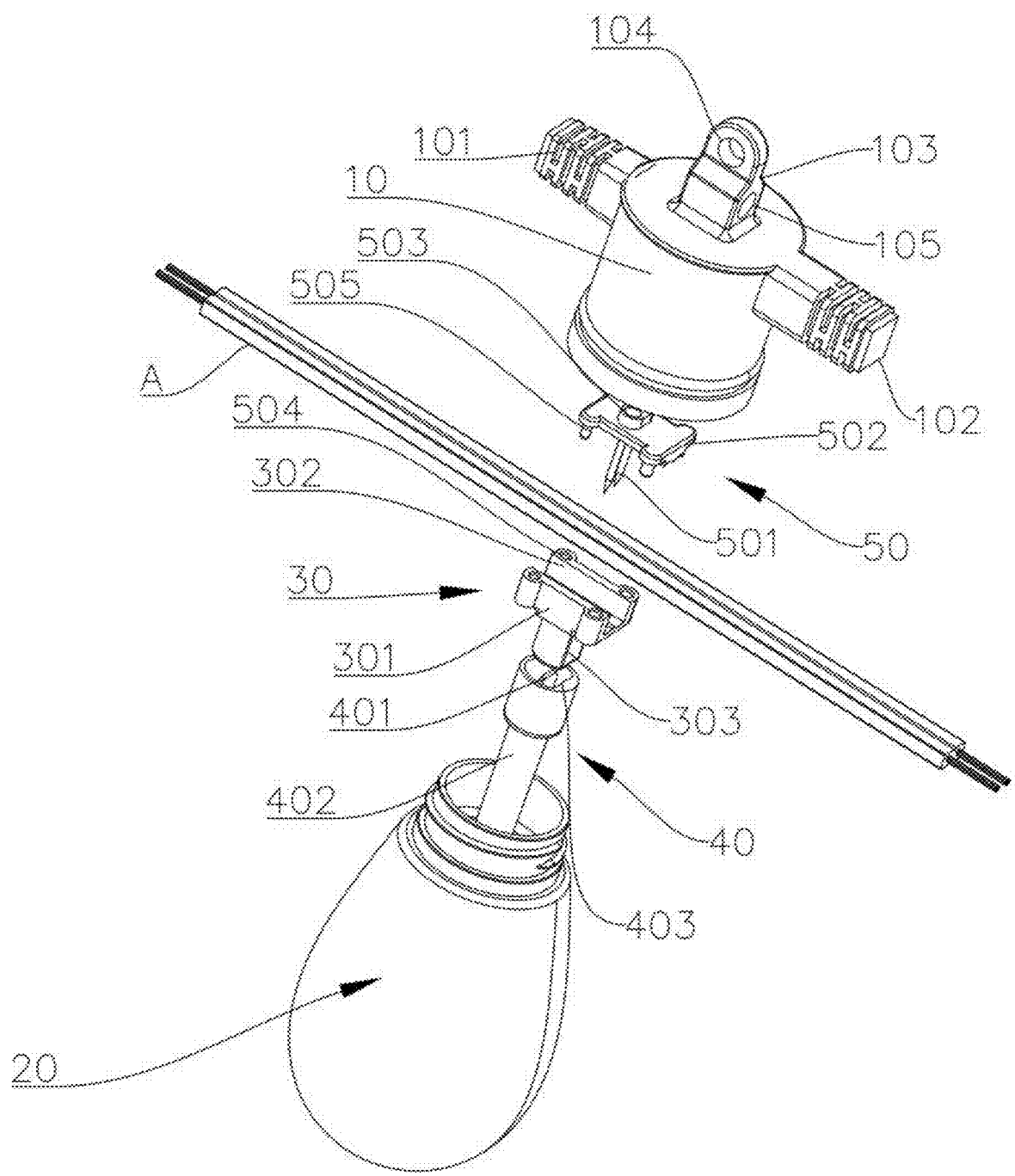
FIG. 5 is a schematic diagram of an explosive structure of the LED lighting fixture according to the present disclosure.
Figure 6:
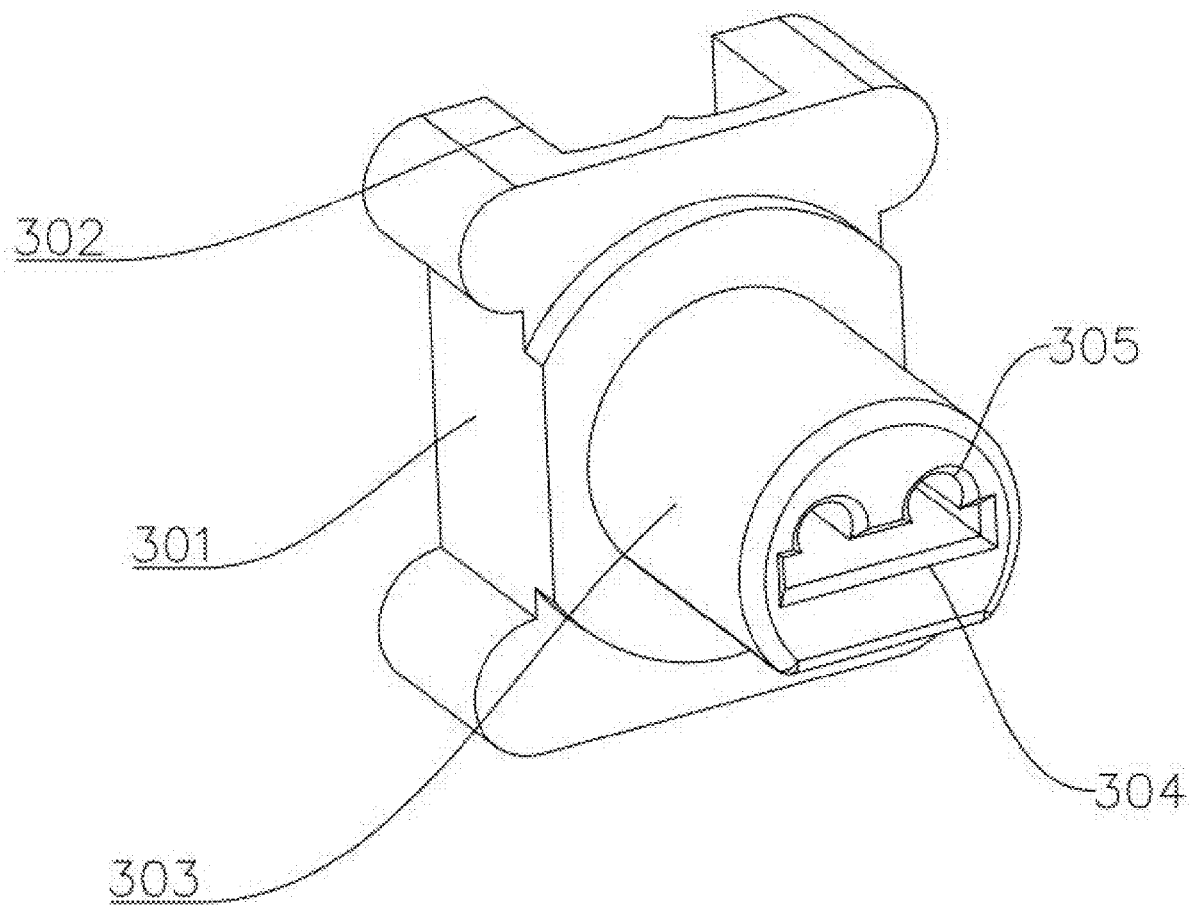
FIG. 6 is an overall schematic diagram of an installation component in the LED lighting fixture of the present disclosure.
Figure 7:
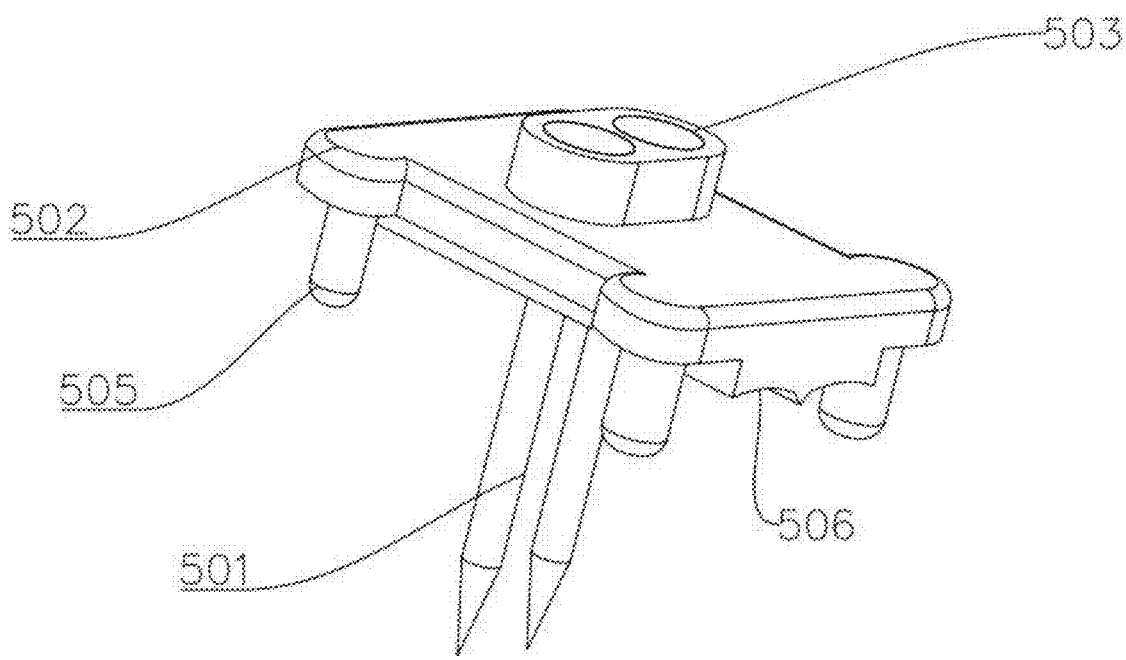
FIG. 7 is an overall schematic diagram of a conductive component in the LED lighting fixture of the present disclosure.

Please refer to FIGS. 1 to 7, an LED lighting fixture includes a lamp cover 10, a lampshade 20, an installation component 30, a light source component 40, and a conductive component 50. The lampshade 20 is provided below the lamp cover 10. The installation component 30 is provided inside the lamp cover 10, and an installation slot 302 configured for a wire A to pass through is provided inside the installation component 30. The light source component 40 is provided inside the lampshade 20. The conductive component 50 is provided above the installation slot 302, and the conductive component 50 penetrates the wire A located inside the installation slot 302 and contacts the light source component 40 to turn on the light source component 40 when powered on.

In this embodiment, during operation, the wire A passes through the lamp cover 10 and located in the installation slot 302 of the installation component 30, and then the conductive component 50 penetrates through the wire A and is electrically connected to the light source component 40, so that the light source component 40 is powered on and light up.

The present disclosure relates to an LED lighting fixture, which limits a position of the wire A through the installation slot 302, and at the same time, the conductive component 50 directly penetrates the wire A and is electrically contacted with the light source component 40, thereby enabling the light source component 40 to be powered on and light up, thereby avoiding the segmentation, peeling, and complex wiring steps of the wire A in the process. The process is simple and easy to understand, rendering it convenient for a worker to quickly grasp and operate, greatly improving production efficiency, reducing production costs, and suitable for industrial applications.

In an implementation mode, two sides of the lamp cover 10 are provided with a wire inlet end 101 and a wire outlet end 102 for the wire A to pass through. The installation component 30 includes an installation seat 301, the installation slot 302 is provided inside the installation seat 301, and two ends of the installation slot 302 are aligned with the wire inlet end 101 and the wire outlet end 102, respectively. During operation, the wire A enters the lamp cover 10 from the wire inlet end 101, is located in the installation slot 302, and finally extends from the wire outlet end 102. Through the above settings, a connection between the wire A and the lamp cover 10 can be effectively and stably achieved.

In an implementation mode, the conductive component 50 includes a threading nail 501, the threading nail 501 is provided on the installation slot 302, and a lower of the threading nail 501 penetrates through the wire A, extends out of a bottom of the installation seat 301, and abuts against with the light source component 40 for the light source component 40 be to powered on and light up. In this embodiment, there are two threading nails 501, each used to pierce the neutral wire in the wire A.

In an implementation mode, the conductive component 50 further includes an installation plate 502; the installation plate 502 is provided above the installation seat 301, and the installation plate 502 is provided with a first nail groove 503 for the threading nail 501 to pass through. In an implementation mode, an upper of the installation seat 301 is provided with a connection hole 504, and a bottom of the installation plate 502 is provided with a connection column 505 corresponding to the connection hole 504. The installation plate 502 is detachably provided above the installation seat 301 through the connection hole 504 and the connection column 505. In an implementation mode, during operation, an automatic or semi-automatic nail driving machine is used to drive nails through the first nail groove 503 of the installation plate 502 into the installation slot 302, pass through the wire A and contact with the light source component 40, thereby achieving electrical illumination of the light source component 40, stable electrical contact, and low failure rate. In an implementation mode, a lower of the installation plate 502 corresponding to the wire A located in the installation slot 302 is provided with a pressing block 506. A bottom of the pressing block 506 has a curvature that is suitable for the upper of the wire A. During operation, when the installation plate 502 is provided above the installation seat 301, the pressing block 506 presses against the wire A, thereby ensuring that the wire A is stably installed in the installation slot 302.

In an implementation mode, the light source component 40 includes a wick 401, and the wick 401 is provided below the installation seat 301. A bottom of the threading nail 501 penetrates through the installation seat 301 and is electrically contacted with the wick 401, so that the wick 401 is powered on and light up.

In an implementation mode, the installation component 30 further includes a guide seat 303 provided at the bottom of the installation seat 301. The guide seat 303 is provided with a first accommodation groove 304 configured to accommodate an end of the wick 401 and a second accommodation groove 305 configured to accommodate the threading nail 501. The first accommodation groove 304 and the second accommodation groove 305 are adjacent and communicated with each other. When the threading nail 501 passes through the installation seat 301, the threading nail 501 is located in the second accommodation groove 305 and contacts the wick 401 located in the second accommodation groove 305. In an implementation mode, the guide seat 303 is integrally processed with the installation seat 301, and a bottom of the guide seat 303 is provided with a second nail groove that is communicated to the installation slot 302. In an implementation mode, the first nail groove 503, the second nail groove, and the second accommodation groove 305 on the installation plate 502 are on the same axis, so that when the threading nail 501 passes through the wire A, it can be stably located in the second accommodation groove 305 and is contacted with the upper of the wick 401, thereby electrically lighting up the wick 401.

In an implementation mode, the light source component 40 further includes a lamp sleeve 402. The wick 401 is provided inside the lamp sleeve 402, and an upper of the wick 401 is provided with a connection groove 403 configured to connect the guide seat 303. In a working condition, the guide seat 303 is provided in the connection groove 403. In an implementation mode, during installation, an upper of the wick 401 is aligned with the first accommodation groove 304, and then the guide seat 303 is inserted into the connection groove 403 to ensure that the wick 401 can be stably installed in the first accommodation groove 304.

In an implementation mode, a lower of the lamp cover 10 is connected to an upper of the lampshade 20 by threads. Above the lamp cover 10, there is a hanging bracket 103 for hanging. In an implementation mode, the hanging bracket 103 is provided with a first hanging hole 104 and a second hanging hole 105. The first hanging hole 104 is vertically offset from the second hanging hole 105, and directions of the first hanging hole 104 and the second hanging hole 105 are arranged at a predetermined angle to each other. This predetermined angle can be set according to actual needs during production. In an implementation mode, the preset angle is 90 degrees.

The present disclosure further disclose an assembling method for a lighting fixture, applied to the aforementioned LED lighting fixture, including the following steps: flattening the entire wire A to ensure no twisting or knotting; accurately placing the wire A into the installation seat 301 with the installation slot 302, ensuring that wire A to be a correct position; installing the installation plate 502 and ensuring a tight fit between the installation plate 502 and the installation seat 301; using an automatic or semi-automatic nail driver, driving the threading nail 501 into the installation seat 301 according to a preset first nail groove 503, and threading out of the second nail slot of the installation seat 301 and entering into the second accommodation groove 305; wrapping each connection with adhesive to ensure that an insulation layer is intact and not exposed; in an implementation mode, soft adhesive is injected between the installation seat 301 and the lamp cover 10 through injection molding technology, effectively improving the waterproof performance of the lighting fixture; then inserting the wick 401 into the first accommodation groove 304, so that the wick 401 to be electrical connect with the threading nail 501, completing an assembly of the lighting fixture; performing a lighting test to confirm that the lighting fixture is working normally.

The present disclosure relates to an LED lamp and an assembling method thereof. The wire A is limited by the installation slot 302, and the threading nail 501 is used to pass through the wire A and the installation seat 301, and then contacts with the wick 401 to achieve electrical conductivity and light up the wick 401, thereby avoiding the segmentation, peeling, and complex wiring steps of the wire A in the process. The process is simple and easy to understand, rendering it convenient for a worker to quickly grasp and operate, greatly improving production efficiency and reducing production costs. At the same time, through the nail connection method, the electrical contact is stable, and the failure rate is reduced.

The above embodiments only express several embodiments of the present disclosure, and their descriptions are more specific and detailed, but should not be understood as limiting the scope of the present disclosure. It should be noted that for those skilled in the art, several modifications and improvements can be made without departing from the inventive concept, which are within the protection scope of the present disclosure. Therefore, the protection scope of the present disclosure should be based on the appended claims.

What is claimed is:

1. An LED lighting fixture, comprising a lamp cover, a lampshade, an installation component, a light source component, and a conductive component;
   wherein the lampshade is provided below the lamp cover; the installation component is provided inside the lamp cover, and an installation slot configured for a wire to pass through is provided in the installation component; the light source component is provided inside the lampshade; the conductive component is provided above the installation slot, and the conductive component penetrates the wire located in the installation slot and contacts the light source component to turn on the light source component when powered on.

2. The LED lighting fixture according to claim 1, wherein two sides of the lamp cover are provided with a wire inlet end and a wire outlet end for the wire to pass through; the installation component comprises an installation seat; the installation slot is provided in the installation seat, and two ends of the installation slot are aligned with the wire inlet end and the wire outlet end, respectively.

3. The LED lighting fixture according to claim 2, wherein the conductive component comprises a threading nail; the threading nail is provided on the installation slot;
   a lower of the threading nail penetrates the wire, extends out of a bottom of the installation seat, and abuts against the light source component for the light source component to be powered on and light up.

4. The LED lighting fixture according to claim 3, wherein the conductive component further comprises an installation plate; the installation plate is provided above the installation seat, and the installation plate is provided with a first nail groove for the threading nail to pass through.

5. The LED lighting fixture according to claim 4, wherein the light source component comprises a wick; the wick is provided below the installation seat;
   a bottom of the threading nail penetrates through the installation seat and is electrically contacted with the wick, so that the wick is powered on and light up.

6. The LED lighting fixture according to claim 5, wherein the installation component further comprises a guide seat provided at the bottom of the installation seat; the guide seat is provided with a first accommodation groove configured to accommodate an end of the wick and a second accommodation groove configured to accommodate the threading nail;
   the first accommodation groove and the second accommodation groove are adjacent and communicated to each other;
   when the threading nail passes through the installation seat, the threading nail is located in the second accommodation groove and contacts the wick located in the second accommodation groove.

7. The LED lighting fixture according to claim 6, wherein the light source component further comprises a lamp sleeve;
- the wick is provided inside the lamp sleeve,
  - an upper of the wick is provided with a connection groove configured to connect the guide seat;
  - in a working state, the guide seat is provided in the connection groove.

8. An assembling method for the lighting fixture according to claim 7, wherein the assembling method comprises the following steps:
- flattening the wire to ensure no twisting or knotting;
- placing the wire into the installation seat with the installation slot, ensuring the wire to be in a correct position;
- installing the installation plate to ensure a tight fit between the installation plate and the installation seat;
- using an automatic or semi-automatic nail driver, driving the threading nail into the installation seat according to a preset first nail slot and entering the second accommodation groove;
- wrapping each connection with adhesive to ensure that an insulation layer is intact and not exposed;
- inserting the wick into the first accommodation groove to make electrical contact with the threading nail and complete an assembly of the lighting fixture;
- performing a lighting test to confirm that the lighting fixture is working normally.

9. The LED lighting fixture according to claim 1, wherein a lower of the lamp cover is connected to an upper of the lampshade by threads.

10. The LED lighting fixture according to claim 1, wherein a hanging bracket is provided above the lamp cover for hanging.

* * * * *